United States Patent
Carretero

(10) Patent No.: US 7,278,409 B2
(45) Date of Patent: Oct. 9, 2007

(54) SYSTEM FOR CONTROLLING THE TEMPERATURE OF THE INTAKE AIR IN INTERNAL COMBUSTION DIESEL ENGINES

(75) Inventor: Herminio N Carretero, Motilla del Palancar (ES)

(73) Assignee: Nagares S.A. (ES)

( * ) Notice: Subject to any disclaimer, the term of this patent is extended or adjusted under 35 U.S.C. 154(b) by 81 days.

(21) Appl. No.: 10/522,040

(22) PCT Filed: Jul. 24, 2002

(86) PCT No.: PCT/ES02/00369

§ 371 (c)(1),
(2), (4) Date: Jan. 20, 2005

(87) PCT Pub. No.: WO2004/011795

PCT Pub. Date: Feb. 5, 2004

(65) Prior Publication Data

US 2005/0235970 A1 Oct. 27, 2005

(51) Int. Cl.
*F02M 31/00* (2006.01)
(52) U.S. Cl. .................................................. 123/556
(58) Field of Classification Search ............... 123/556, 123/549; 219/205
See application file for complete search history.

(56) References Cited

U.S. PATENT DOCUMENTS

| | | | | |
|---|---|---|---|---|
| 3,985,112 A | * | 10/1976 | Jordan | 123/549 |
| 4,345,141 A | * | 8/1982 | Little | 219/207 |
| 4,375,799 A | * | 3/1983 | Swanson | 123/549 |
| 4,491,118 A | * | 1/1985 | Wooldridge | 123/549 |
| 4,587,843 A | * | 5/1986 | Tokura et al. | 73/204.24 |
| 5,038,742 A | * | 8/1991 | Uddin | 123/549 |
| 5,988,146 A | | 11/1999 | Anderson et al. | |
| 6,152,117 A | | 11/2000 | Prust | |
| 2002/0000221 A1 | | 1/2002 | Kilb et al. | |
| 2002/0166546 A1 | * | 11/2002 | Andrews et al. | 123/556 |

FOREIGN PATENT DOCUMENTS

| | | |
|---|---|---|
| EP | 1 136 695 A1 | 9/2001 |
| JP | 60116849 | 6/1985 |
| WO | WO 00/34643 | 6/2000 |

* cited by examiner

*Primary Examiner*—Marguerite McMahon
(74) *Attorney, Agent, or Firm*—Ostrolenk, Faber, Gerb & Soffen, LLP

(57) ABSTRACT

The system is meant to heat the intake air in internal combustion Diesel engines and is based on the use of a resistor having two segments (1) and (1') joined to each other on one end (2), the segments (1) and (1') being made of different metal alloys to form a thermocouple that allows using the module determined by this resistor with a control circuit to automatically regulate the temperature of the intake air, as well as to know the flow rate entering each cylinder from a measurement of the amount of heat supplied to the air flow entering each cylinder of the engine. The system will be disposed in correspondence with the intake duct (4) of the corresponding engine cylinder (3), where the union (2) of the segments (1) and (1') which form the resistor must be located at the center of said duct (4), where the air flow is greatest.

3 Claims, 2 Drawing Sheets

SYSTEM FOR CONTROLLING THE TEMPERATURE OF THE INTAKE AIR IN INTERNAL COMBUSTION DIESEL ENGINES

PRIORITY CLAIM

This is a 35 U.S.C. §371 national phase of International Application No. PCT/ES2002/000369, filed on Jul. 24, 2002.

OBJECT OF THE INVENTION

The present invention relates to a system for controlling the temperature of the intake air in internal combustion Diesel engines, based on the use of a heating and control module placed at the inlet of the corresponding engine intake. This module is mainly comprised of two segments made of different metal alloys welded on their ends to form a thermocouple, which together with a control circuit allows not only to supply energy to the air flow crossing it but also to know its working temperature.

The object of the invention is to provide a system which, when applied to each intake inlet of an internal combustion Diesel engine, in addition to allowing controlling and/or regulating automatically the temperature of the intake air also acts a sensor of mass consumption, that is, as a flow sensor in each intake inlet.

BACKGROUND OF THE INVENTION

It is known that in current Diesel engines with direct injection systems the temperature of the intake air is increased by compression, so that during the compression run of the piston the injection system injects fuel at the point in which combustion is desired.

This is relatively simple, yet there are certain drawbacks such as emission of pollutants, as these depend greatly on the temperature of said combustion. In general terms, one can say that combustion at low temperatures produces soot particles, smoke, etc., while at high temperatures it produces $NO_x$.

As regards injection systems, manufacturers are working with injectors allowing nulti-injections at increasingly high pressures, which enables an outstanding control of the amount of fuel and the injection point.

Within this frame it can be seen that all improvements made in these injection systems are limited in practice by the air management systems, as however precise the control of the injected fuel is, unless there is an equally precise control of the air mass introduced in the cylinder and its temperature when the intake valve is closed it will not be possible to optimise combustion nor, therefore, polluting emissions cycle by cycle.

Air management is even more difficult when exhaust gas re-circulation systems (EGR) participate, taking hot air from the exhaust and sending it to the intake.

However, heating intake air with resistors is used frequently, and in this sense can be cited patents WO00/34643; U.S. Pat. No. 6,152,117 and U.S. Pat. No. 5,988,146, which describe heating resistors, although they are meant for use in Diesel engines of large size where sturdiness is more important than performance, performance being understood here as short pre-heating times, as well as low load losses and a self regulation capacity with a response time on the order of characteristic engine times (the inverse of the engine revolution rate), etc. On the other hand, these resistors provide no information on the temperature at which they operate, which makes it impossible to perform a closed loop regulation so that it is not possible to operate at high temperatures (500-1,200° C.), since at these temperatures a control failure can result in the destruction of the resistor.

To implement the regulation function with the heaters described in the aforementioned patents, a standard thermocouple can be welded to them; however, in addition to the cost and industrialization problems associated to this, this entails functionality problems as if the thermocouple welded is made of small section wires it will not be very sturdy and the weld will break easily with the dilations and contractions of the resistor as it is successively heated and cooled, as well as due to the vibrations of the engine; it should be kept in mind that the element is placed at the inlet of the intake pipes, on the cylinder head and very near the cylinders.

If the above-described problem is to be solved, one must weld a thermocouple made of wires with a relatively large section. However, the heat will then flow from the reading point through the thermocouple cable, so that the reading will be false. Moreover, welding a thermocouple to the resistor and placing a piece of wire in the path of the airflow creates a singularity in the surface of the resistor, at the measurement point, which makes the temperature measured erroneous in any event.

In view of the above, it would be desirable to be able to set the temperature of the intake air and know the airflow at each inlet of the intake pipes.

DESCRIPTION OF THE INVENTION

The system disclosed has been conceived to solve the above described drawbacks, and more specifically to allow controlling the temperature of the intake air of automotive Diesel engines, so that it is possible to dynamically control the amount of heat supplied to the airflow entering each cylinder of the engine.

More specifically, the system of the invention involves using a heating resistor formed by two segments, each segment having metallurgical properties such that their union defines a thermocouple which, in combination with a control circuit, allows controlling and measuring the temperature of the intake air to the extent that the temperature of said intake air is constant and independent of the ambient temperature.

The two segments of the heating resistor consist of different metal alloys welded to each other, so that the union should preferably be located in the centre of the section crossed by the flow, with the module formed by the resistor and the circuit control being placed at the intake inlet.

The temperature measurement system on which the system is based is the same as that used by thermocouples, that is, the Seebeck effect, which states that "when two strips of different metals are joined to form a closed circuit and their unions are placed at different temperatures, a weak yet measurable current will appear in the circuit". If the circuit is opened, what is measured is the electromotive force generated by the difference in temperatures between the unions; it should be kept in mind that what is observed is a thermoelectric phenomenon, so that it is the cable generating the electromotive force and not the union, since the latter is used only to close the circuit.

Obviously, this is also the reason why two different metals are needed for the resistor, as if the two were identical then equal and opposite potential differences would be generated and nothing would be measured.

The resistor forming the fundamental part of the system of the invention, according to the above described characteristics, determines a thermocouple as it is formed by the union of two metals at the ends of which it is possible to measure a voltage that is a function of the temperature of the union, the main characteristic of this thermocouple being that the materials forming the union, due to both their metallurgical properties and their physical dimensions and mechanical properties, allow using the thermocouple alternately as a heating resistor or as a thermocouple as such.

As regards the control circuit that is also part of the system, it is connected between the output terminals of the resistor so that at the output of the resistor that is not earthed a voltage is measured, which when previously conditioned by an amplifier is the temperature signal of the resistance. All of this is such that when there is no power activation signal the resistance behaves as a thermocouple.

Whenever there is a power activation signal the control circuit will supply energy pulses to the resistor and after each pulse sent it compares the temperature signal with a preset reference temperature signal. Thus, when the resistor temperature is greater than the reference temperature the control circuit will not do anything and when the resistor temperature is lower than the reference a new energy pulse is supplied to raise the temperature, so that it is maintained on the average at the reference temperature set. This is, when the activation power signal is activated the control circuit will automatically act as required to maintain the resistor temperature at the reference temperature at which the resistor is meant to operate.

As regards the measurement of the airflow crossing the resistance, it can be performed in several ways, according to at least three different methods.

A first method consists of the following operative stages:
Supplying a known energy pulse to the airflow.
Measuring the temperature of the plate at the time in which energy stops being supplied, which informs indirectly of the temperature of the airflow at such time.
Waiting for the plate temperature to stabilise, measuring this time elapsed.
Measuring the temperature again, which will inform of the ambient temperature of the airflow.
Data regarding the difference in temperature and the time required to attain the temperature provide the information required to calculate the airflow.

A second method used to estimate the airflow is based solely on measuring the plate temperature, under a few assumptions, with the equation $Q = \rho \cdot V_c / t$, where Q is the airflow to be known, $\rho$ is the density of the gas, $V_c$ is the cylinder volume and t is the time during which the cylinder is being filled. $V_c$ and t are known data and we know that $\rho$ depends on the temperature of the gas, which depends on the temperature of the resistor, which is the value that is measured.

A third method used to estimate the airflow relies on constantly supplying energy in order to maintain the plate temperature constant, so that the instantaneous measurement of the energy required to maintain this temperature provides the airflow in the same manner as a hot wire flow meter.

In every case, all methods rely on using the heating resistor with an intrinsic thermocouple according to the above described characteristics.

DESCRIPTION OF THE DRAWINGS

As a complement of the description being made and in order to aid a better understanding of the characteristics of the invention, according to a preferred example of embodiment, a set of drawings is accompanied as an integral part of the description where for purposes of illustration and in a non-limiting manner the following is shown.

PREFERRED EMBODIMENT OF THE INVENTION

Figure 1:
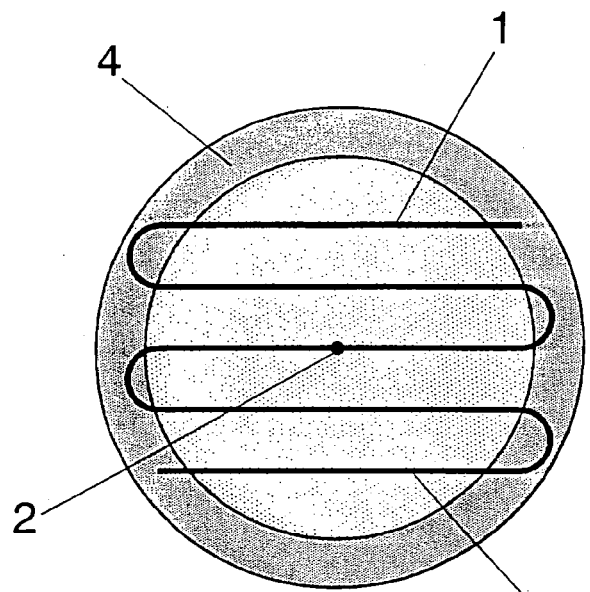
FIG. 1 shows a view of the scheme of the heating resistor mounted on the duct which channels the intake flow, which resistor consists of two segments joined at a point corresponding to the centre of the channelling of the intake flow. These two segments of the resistor are made of different metal alloys.

In view of the above described figures it can be seen that the system of the invention, intended for heating the intake air in internal combustion Diesel engines, is based on using an electrical resistance with a constant resistivity in the entire range of working temperatures, the resistance formed by two segments (1) and (1') joined to each other by one of their ends, the union being labelled as (2) in FIG. 1. The two segments (1) and (1') of the electrical resistor are made of different alloys. The resistor as a whole, because of these characteristics, determines a thermocouple which, in addition to allowing supplying energy to the airflow, allows knowing its operating temperature.

Figure 2:
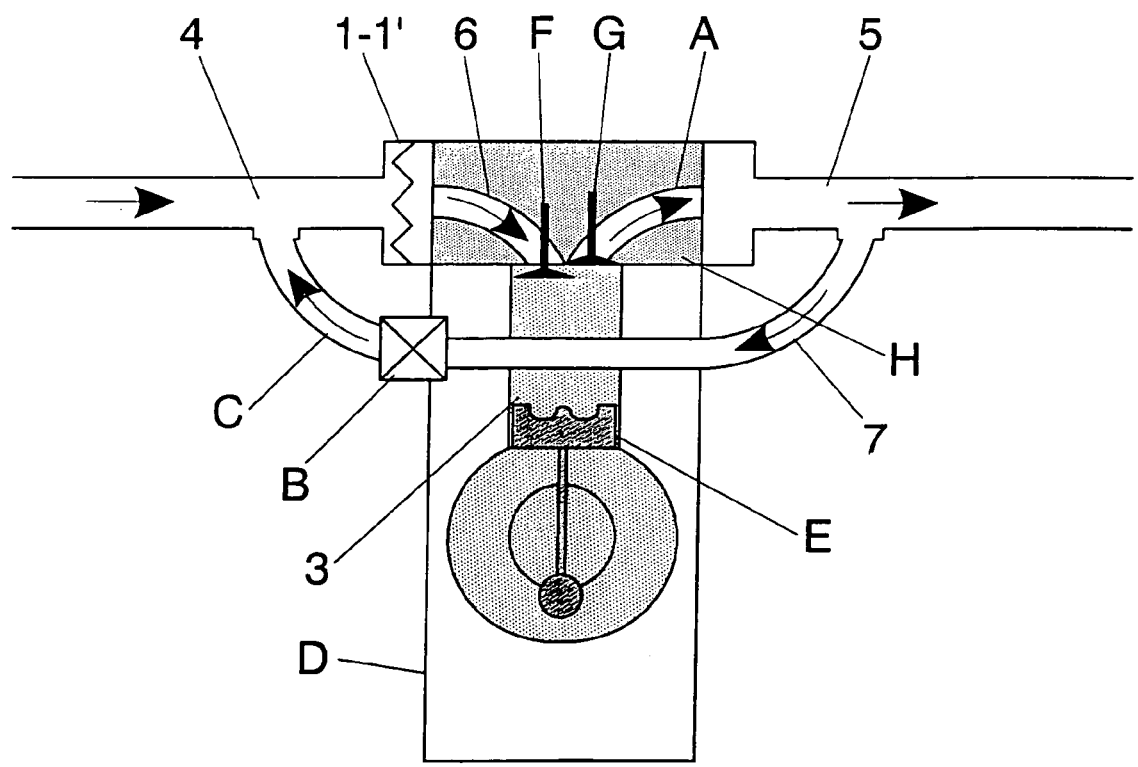
FIG. 2 shows a scheme of the paths established for the intake and exhaust gases in an engine, with the system of the invention included at the intake inlet.

FIG. 2 shows a schematic representation of an internal combustion engine, where one can identify a cylinder (3) in the engine block (D) and the piston (E), the intake pipes (6) and exhaust pipes (A) which determine the paths followed by the gases through the engine seat (H) from the manifolds (4) and (5) to the valves (F) and (G), which allow the gases to enter or leave the cylinder during the intake and exhaust cycles respectively. This figure also shows the exhaust gases re-circulation (EGR) duct (7) and (C) through which part of the exhaust gases are introduced in the intake system when the (EGR) valve (B) is open.

Thus, mounted on the intake (6) of the corresponding cylinder (3) is the module formed by the resistor, consisting of the segments (1-1') joined to each other, and a control circuit described below, such that the union (2) of the two resistor segments (1) and (1') is preferable located in correspondence with the centre of the flow of the intake duct (4), which is where the flow is greatest.

The system thus formed can be used as an automatic regulator of the temperature of the intake air, as a thermocouple type temperature gauge and as a mass consumption gauge.

Figure 3:
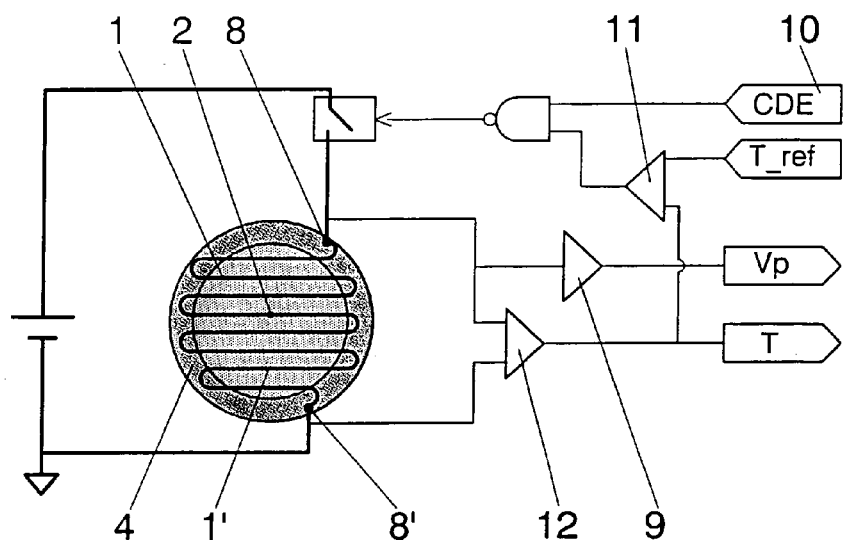
FIG. 3 shows the schematic representation of the practical application of the system of the invention, specifically the automated control of the plate temperature.

FIG. 3 shows the operation scheme, with the two functions for which the system can be used, as well s the output Vp indicating the voltage at the terminal (8) of the resistance segment (1) that is not earthed, with the signal of this output Vp being previously conditioned by an amplifier (9), the signal being used for the flow meter function.

When there is no power activation signal (10) the system will indicate the plate temperature measured at the terminals (8-8') of the resistance formed by the segments (1) and (1'), the signal being previously conditioned by an amplifier (12).

Whenever there is a power activation signal (10) (CDE, FIG. 3) the control circuit supplies energy pulses to the resistor and after each pulse supplied it compares the temperature signal with a preset reference temperature signal, so that when the resistor temperature is higher than the reference temperature the control circuit does nothing, while when the resistor temperature is lower than the reference temperature a new energy pulse will be supplied to the resistor in order to raise its temperature and maintain it on the average at the reference temperature that is set. This is, when the power activation signal (10) is activated the control circuit will automatically perform whatever action is required to keep the resistor temperature at the reference temperature at which the resistor is meant to operate.

A third function deriving from the other two is that of a flow meter, generally using platinum or hotwire, the operation of which is based on disposing two platinum wires in the airflow so that one measures the temperature of the gas and the other, the hot wire, measures the flow; this relies on the fact that the resistivity of platinum depends on the temperature. The operational principle consists of measuring the power that must be supplied to the hot wire, and which the latter releases to the airflow by conduction and convection, to maintain constant the temperature difference between the two wires, the hot and the cold wire.

A first method for estimating the flow involves the following operational stages:

Supplying a known energy pulse to the airflow.

Measuring the temperature of the plate at the time at which energy stops being supplied, which informs indirectly of the temperature of the airflow at such time.

Waiting for the plate temperature to stabilise, measuring this time elapsed.

Measuring the temperature again, which will inform of the ambient temperature of the airflow.

The difference in temperature and the time required to reach it provides all the information necessary to calculate the airflow.

Qualitatively, it is easy to see that when the flow is high both the temperature difference and the decay time will be small. When the flow is low the temperature difference will be high and so will the decay time, so that the differences can be known and tabulated in the same manner as with a classical hotwire sensor.

A second method used to estimate the flow relies only on measuring the temperature of the plate and making certain assumptions:

$$Q = \rho \cdot V_c / t$$

where Q is the gas flow, $\rho$ is its density, $V_c$ is the cylinder volume and t is the time during which the cylinder is filled. Vc is known as it is a constructive parameter of the engine; t is also known as it is inversely proportional to the engine rate of revolution (K/rate) and two assumptions are made: that the density depends only on the temperature of the gas and that the temperature of the gas depends only on the plate temperature Tg, so that the density is a function of the plate temperature ($\rho = f(Tg)$). In these conditions the expression for the flow becomes:

$$Q = f(Tg) \cdot V_c \cdot \text{rate}/K$$

And for each engine specifically, giving $V_c$ a value and taking $K_1 = V_c/K$, the resulting expression for the flow is:

$$Q = f(Tg) \cdot K_1 \cdot \text{rate}$$

A third method for estimating the flow can be applied in engines working at a constant intake temperature, in which case the system provides energy constantly in order to maintain the temperature of the plate constant. The power supplied at each instant to keep the resistor temperature constant will provide the flow in the same manner as a hot wire flow meter does. This power is measured using the signal Vp (FIG. 3 and FIG. 4), as the value of the resistance is constant and Vp indicates the voltage supplied and the time during which it is supplied. This method is equivalent to the previous one, setting constant the density of the gas which enters the cylinder.

Figure 4:
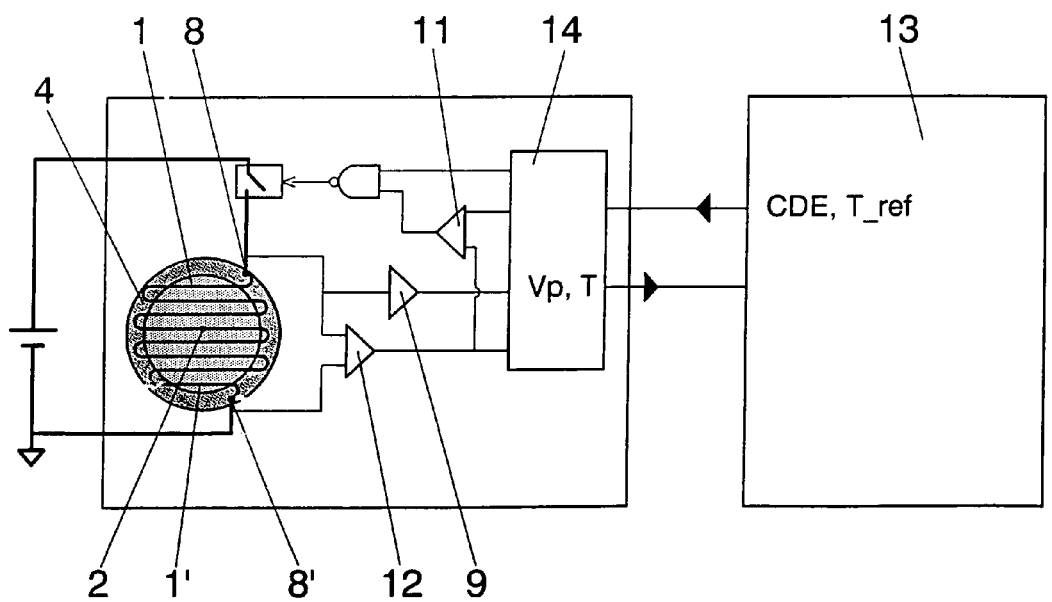
FIG. 4 shows, finally, the same schematic representation of the previous figure associated to a unit for electronic engine control.

FIG. 4 shows the connection of the control circuit for the intake air temperature according to the scheme shown in FIG. 3, with the engine electronic control unit (13), with an interface (14) included which can be analogue or digital for the signals $V_p$ and temperature at the resistor terminals.

All cases mentioned above rely on the use of a heating resistor with an intrinsic thermocouple according to the characteristics described.

The invention claimed is:

1. A system for controlling intake air temperature in an internal combustion Diesel engine suitable for heating intake air and controlling the temperature, the system comprising a module including heating means and a control circuit, said module being placed at each intake inlet in order to heat and control the temperature of the intake air up to a limit at which the temperature is maintained constant and independent of ambient temperature, the heating means including a resistor having two segments made of different metal alloys, joined on one of their ends to form a thermocouple, the joint of said segments being placed in centre of an intake duct.

2. The system for controlling the intake air temperature in an internal combustion Diesel engine according to claim 1, wherein the control circuit is connected to terminals of the resistor formed by the segments and is responsive to two control signals CDE and T_ref which are a power activation signal and a signal indicating working temperature, respectively, the control circuit having outputs Vp and T that indicate voltage at the resistor terminals and temperature of the resistor, respectively, the outputs having corresponding amplification and conditioning circuits, the control circuit further including a comparator with which an energy supply to the resistor is ordered when the power activation signal (CDE) is activated.

3. The system for controlling the intake air temperature in an internal combustion Diesel engine according to claim 1, wherein the control circuit is connected to an electronic control unit of the engine, with an interposed interface that can be analogue or digital.

* * * * *